United States Patent [19]

McInnis

[11] 4,227,669
[45] Oct. 14, 1980

[54] HANGER AND METHOD FOR SOUND SPEAKERS

[76] Inventor: Donald E. McInnis, 444 Saratoga Ave. 15-H, Santa Clara, Calif. 95050

[21] Appl. No.: 27,987

[22] Filed: Apr. 9, 1979

[51] Int. Cl.² ............................................ F16M 13/02
[52] U.S. Cl. .................................... 248/317; 211/113; 248/328
[58] Field of Search ............... 248/317, 318; 211/113, 211/117; 47/67; 220/92, 95; 294/74, 77; 179/146 E

[56] References Cited

U.S. PATENT DOCUMENTS

| | | | |
|---|---|---|---|
| 296,769 | 4/1884 | Miller et al. | 294/77 X |
| 1,827,447 | 10/1931 | Wilmore | 294/77 X |
| 3,292,831 | 12/1966 | Moen | 294/74 UX |
| 3,701,559 | 10/1972 | Marino et al. | 294/74 |
| 3,765,711 | 10/1973 | Hammond | 294/77 |
| 3,918,618 | 11/1975 | Castaneda | 294/74 X |
| 4,061,092 | 12/1977 | Jacobsen et al. | 248/317 X |
| 4,101,109 | 7/1978 | Edwards | 248/317 |

Primary Examiner—J. Franklin Foss
Attorney, Agent, or Firm—Gerald L. Moore

[57] ABSTRACT

A hanger for suspending sound speakers from a standard ceiling whereby adjustment can be made of the speaker position for best sound dispersal.

7 Claims, 4 Drawing Figures

HANGER AND METHOD FOR SOUND SPEAKERS

BACKGROUND OF THE INVENTION

In the typical high fidelity installation in a home, the speakers are usually placed directly on the floor or are supported on shelves mounted on the wall. In either instance the speakers are mechanically coupled to the solid wall or floor in a manner to substantially change the sound characteristics of the speaker cabinet primarily by the introduction of resonance frequencies, and thereby alter the sound emanating from the loudspeakers. In the instance of setting the speakers directly on the floor, the sound is emanated in close proximity to the floor which is usually covered by a sound-absorbing carpet thereby substantially attenuating the reproduced sound. In addition, the speakers are positioned substantially below the level of the listener to further reduce the efficiency of the sound generation. As a result of these difficulties, the technical capabilities of the enclosures are sacrificed when the speakers are placed in a room in positions dictated primarily by practical space and aesthetic considerations.

It is the purpose of the present invention to provide for an effective positioning of the speakers away from the floor to lessen the sound attenuation by the floor covering and also to decouple the cabinet from the room sufficiently to substantially do away with any vibratory interaction between the speaker cabinet and the room structure. A further purpose of this invention is to allow the efficient use of such speakers in a standard room of a home.

SUMMARY OF THE INVENTION

A method and apparatus for supporting from the ceiling a sound speaker enclosure having front, back, bottom and two side walls, comprising first and second supports fixed to the ceiling above the position selected for the speaker enclosure and spaced apart a distance less than the length of the top wall extending between the two side walls and a plurality of first flexible cords having two ends with one end fixed to one support and the other end fixed to the other support so as to hang down from the ceiling a sufficient distance to cradle the speaker enclosure by extending along one side wall, the bottom wall and back up the other side wall. Second flexible cords connect the first flexible cords and extend across the bottom corners of the front wall while others extend along the back wall adjacent the side walls. A third flexible cord connects the first flexible cords and extends along the upper portion of the back wall which can be adjusted in length to alter the attitude of the speaker enclosure for proper sound dispersal.

DESCRIPTION OF THE INVENTION

Figure 1:
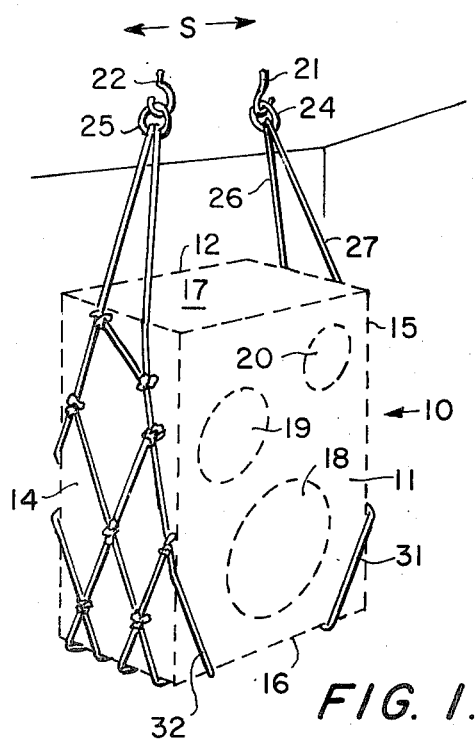
FIG. 1 shows a sound speaker of the type supported by the subject invention.
Figure 3:
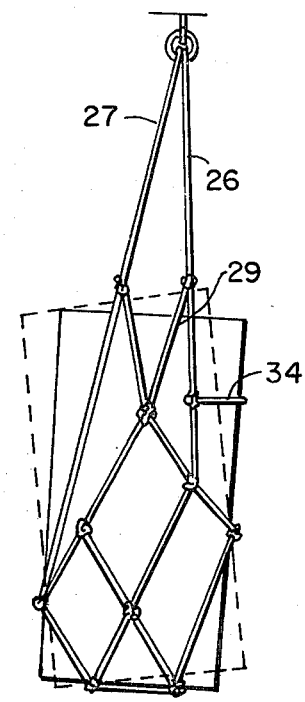
FIG. 3 is a side view of the apparatus of FIG. 2.

In FIG. 1 is shown a speaker enclosure 10 of one type used with the subject invention. The speaker enclosure includes a front wall 11, a back wall 12, side walls 14 and 15, a bottom wall 16 and a top wall 17. The enclosure includes openings in the front wall 11 in which are positioned speakers 18, 19 and 20. Usually the walls of such a speaker enclosure are made of wood to provide the proper resonance for the transmittal of sound from the speakers out the front wall. Such speaker enclosures usually weigh 25 to 60 pounds on the average.

The speaker enclosures are constructed to stand alone on the floor and are usually utilized in pairs for the projection of stereo sound. However problems exist in finding satisfactory floor space for separating two such enclosures approximately 8 to 12 feet for the proper stereo effect. In addition when the speaker is placed directly on the floor, vibrations can be transmitted into the floor and the overall efficiency of the speaker enclosure is affected. The mechanical coupling between the enclosure and the floor can result in resonance frequencies being generated which sound distorts the signals being transduced. Also by positioning the speakers directly adjacent a floor covering such as a rug, the sound is substantially attenuated by the sound-absorbing rug materials. The attenuation is further aggravated by the fact that the speakers are directed well below head level.

In accordance with the present invention there is provided a method and apparatus for efficiently hanging such a speaker enclosure from the ceiling of the room in a manner to reduce the sound coupling between the speaker and the walls and ceiling of the room and such that the speaker attitude can be varied for effective sound dispersal within the room. In addition, the method of hanging allows for support of the speakers from a standard gypsum ceiling.

Accordingly, there is attached to the ceiling a pair of supports 21 and 22 which preferably are standard toggle bolts fixed to a screw expander and having a hook attached. Rings 24 and 25 preferably are suspended from the hooks to which are tied a plurality of flexible soft cords 26, 27 and 28 having two ends with opposite ends being fastened to separate rings 24 and 25. These cords drape downward a sufficient distance at midpoint to cradle the speaker cabinet therebetween. The cords are joined randomly or in a pattern by a plurality of second cords 29, 30, 31 and 32 in the form of a macrame or other soft pliable and flexible hanger such that at least one cord 26 extends down along the back wall 12 of the enclosure adjacent the side walls 14 and 15. The choice of the number and location of some of these second cords is dependent on the aesthetic values of the speaker support. Also additional supports can be added as necessary to support the weight of the enclosure. Preferably the second cords are attached to the first cords in a manner to allow the position of the attachment to be adjusted to accommodate various sizes and shapes of speakers.

The second cords 31 and 32 are tied at spaced points to the cord 28 in a manner to extend across the lower corners of the front wall 11 joining the bottom wall 16. In this manner the speaker enclosure is supported by the main cords extending down along the side wall 14, the bottom wall 16 and back up the side wall 15 to the spaced rings 24 and 25 fixed to the toggle hooks 21 and 22. The second cords prevent spreading of the main cords and in being extended around the edges adjacent the enclosure front and back walls, provide sufficient support for maintaining the enclosure at a proper attitude.

The cords preferably are made of a soft flexible material having sufficient tensile strength to support the enclosure. By use of such soft materials as macrame and synthetic fibers, any vibratory forces emanating through the enclosure to the supports is effectively absorbed and not transmitted to the ceiling. From a sound consideration, the enclosure is effectively mechanically uncoupled from the hard room surface. In addition the impact loading which would otherwise be transmitted from the enclosure is cushioned and dampened so as to provide less strain on the connection with the ceiling.

It is sometimes advisable to permit tilting of the speaker from the vertical for proper sound dispersal within the room. Such might be necessary to position the speaker so as to project sound more in the downward direction in smaller rooms or more horizontal in larger rooms. For this purpose there is provided a third or cross cord 34 fixed between spaced points of the main cord 26 extending down along the back 12 of the speaker enclosure. This third cord preferably extends parallel to the top wall 17 of the enclosure. By lengthening or shortening this third cord the speaker is tilted relative to the vertical or upright attitude. By shortening the cord 34, the enclosure is tilted to project sound more downward from the horizontal while lengthening of the cord 34 will cause the enclosure to project sound more horizontal. Thus there is provided an easy adjustment of the attitude of the speaker enclosure for proper sound dispersal.

In tilting the speaker, the center of gravity of the enclosure must be maintained within the cradle formed by the flexible cords. For this reason the cords 26, 27 and 28 are extended substantially under the enclosure. The plurality of second cords 31 and 32 are fixed between the first cords in a manner to allow adjustment of the position the cords intersect. The cord positions thus can be altered as the speaker is tilted to assure that the speaker is firmly supported.

Figure 2:
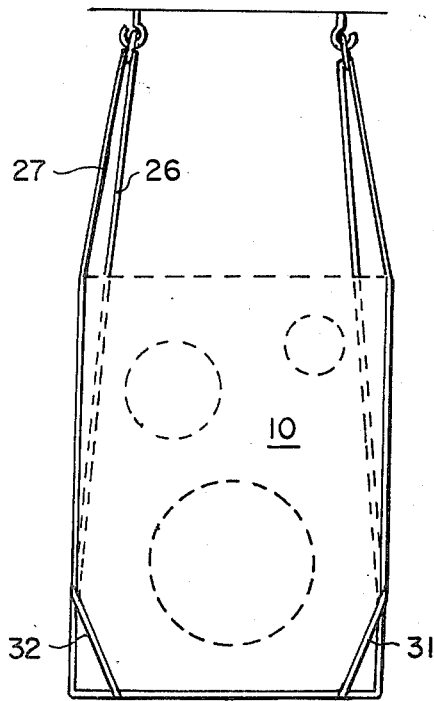
FIG. 2 is a front view of the speaker shown in FIG. 1 and supported by the invention.
Figure 4:
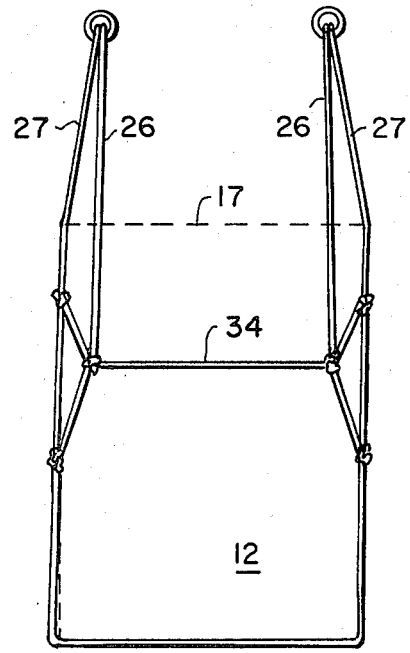
FIG. 4 is a back view of the apparatus of FIG. 2.

It has been found that because of the weight of the speaker enclosure, there is the necessity for the proper positioning of the toggle hooks 21 and 22 to support the weight in the most efficient manner. Most ceilings are formed of one-half inch dry wall or plasterboard having limited capacity to withstand sheer stresses and somewhat more capacity to withstand compressive stresses. Accordingly the supports 21 and 22 are spaced apart a distance of between one-half and two-thirds the width of the top wall 17 of the enclosure as it extends between the side walls 14 and 15. This positioning is shown most clearly in FIG. 2 wherein the distance S is approximately five-eighths of the width of the speaker enclosure. Tests have shown that this positioning of the supports and the use of two supports as shown, are necessary to properly support the weight of normal speaker enclosures and will prevent tilting or swinging of the enclosures. In contrast to positioning these supports so that the main cords extend vertical or extend outward from the plane of the side walls, the positioning of the supports as shown with the main flexible cords extending approximately fifteen degrees inward from the plane of the side walls substantially increases the supporting strength of the ceiling.

By positioning the supports so the pull is outward, the gypsum board ceiling most commonly encountered is placed primarily in compression. Gypsum wallboard will sustain more force in compression than in tension or shear. Tests have shown that up to 230 pounds can be suspended in the manner described from a one-half inch gypsum wallboard ceiling. Conventional methods of support from such a ceiling will hold substantially less weight.

By the use of two supports in the manner described, easy adjustment of the attitude of the speaker enclosure is allowed while maintaining the sound coupling between the enclosure and the ceiling at a low value. As a result there is little resonance generated with the room structure due to mechanical coupling provided by this support such that the sound generated by the speaker is enhanced.

The invention claimed:

1. A method of supporting a sound speaker enclosure from a ceiling of a room, said enclosure having top, two side, back, front and bottom walls, said method comprising the steps of:

placing first and second supports in the ceiling above the location at which it is desired to have the speaker enclosure suspended, said supports being positioned apart less than the width of the enclosure;

fixing to the supports the opposite ends of a plurality of first soft flexible cords and joining the first cords together to form a cradle for holding the enclosure;

placing the enclosure in the cradle of cords with the cords extending from the first support down one side wall of the enclosure, across the bottom wall and back up the other side wall to the second support;

placing second cords so they extend partially across the front and back walls of the speaker; and tying a cross cord between the downwardly extending cords at the position where they extend from the first and second supports adjacent the enclosure back wall and tightening said cross cord sufficiently to tilt the speaker enclosure at the proper angle to effectively project sound across the room.

2. The method as defined in claim 1 including the step of tying second cords to the first cords for joining the first cords to form a cradle for the enclosure.

3. The method as defined in claim 1 wherein the supports are spaced apart a distance of between one-half and two-thirds of the width of the top wall extending between the side walls of the enclosure.

4. A hanger for supporting a speaker enclosure from the ceiling of a room, said enclosure having front, back, bottom, top and two side walls, said hanger comprising in combination:

support means for attachment to the ceiling providing first and second supports spaced apart less than the length of the top wall extending between the two side walls of the enclosure;

a plurality of first flexible cords of approximately equal length and having opposite ends attached to the supports with the cords being of a sufficient length for the midpoint to hang downward a sufficient distance to extend around the side and bottom walls of said enclosure; and a plurality of second flexible cords tied between the first cords at spaced intervals to prevent the spreading of the first cords beyond the enclosure walls including a second cord having one end attached to the first cords adjacent the first support in a position to extend downward along a side wall and diagonally across the back wall to the bottom wall and diagonally upward across the back wall to the other side wall with the free end fixed to first cords extending from the second support.

5. A hanger as defined in claim 4 including a third cord tied at the ends to the first cords at a position adjacent the side walls of the enclosure and extending across the enclosure back wall in a position approximately parallel to the top wall of the enclosure; and
 means to adjust the length of the third cord to tilt the speaker relative to the room for projecting the sound in the proper direction.

6. A hanger for supporting a speaker enclosure from the ceiling of a room, said enclosure having front, back, bottom top and two side walls, said hanger comprising, in combination:
 support means for attachment to the ceiling and providing a plurality of spaced supports;
 a plurality of first flexible cords of approximately equal length and having the ends attached to said supports with the cords being of sufficient length for the midpoint to hang downward a sufficient distance to extend around the side and bottom walls of said enclosure; and
 a plurality of second flexible cords tied between the first cords at spaced intervals to prevent the spreading of the first cords beyond the enclosure walls.

7. A hanger as defined in claim 6 including means fixed between the first cords for shortening and lengthening the distance therebetween for tilting the attitude of the speaker enclosure relative to the room for projecting sound in the proper direction.